US012762904B2

(12) United States Patent
Tamao et al.

(10) Patent No.: US 12,762,904 B2
(45) Date of Patent: Oct. 13, 2026

(54) INFORMATION PROCESSING DEVICE, INFORMATION PROCESSING METHOD, AND STORAGE MEDIUM STORING INFORMATION PROCESSING PROGRAM

(71) Applicant: TOYOTA JIDOSHA KABUSHIKI KAISHA, Toyota (JP)

(72) Inventors: Junichiro Tamao, Tokyo (JP); Takahiro Utsunomiya, Tokyo (JP); Takumi Horie, Tokyo (JP); Tomoaki Karasawa, Matsudo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 18/508,450

(22) Filed: Nov. 14, 2023

(65) Prior Publication Data

US 2024/0177532 A1 May 30, 2024

(30) Foreign Application Priority Data

Nov. 29, 2022 (JP) ................................ 2022-190555

(51) Int. Cl.
*G07C 5/00* (2006.01)
*G07C 5/08* (2006.01)

(52) U.S. Cl.
CPC ............ *G07C 5/008* (2013.01); *G07C 5/085* (2013.01)

(58) Field of Classification Search
CPC ................................ G07C 5/008; G07C 5/085
See application file for complete search history.

(56) References Cited

U.S. PATENT DOCUMENTS

2016/0004479 A1* 1/2016 Hayes .................. G06F 3/0608 711/103
2016/0023663 A1* 1/2016 Kajiwara ............ B60R 16/0231 701/36
2021/0297521 A1* 9/2021 Nagumo ............. H04M 1/6091
2023/0120263 A1* 4/2023 Kim ...................... G06F 3/0611 711/158
2023/0305719 A1* 9/2023 Monta ................... G06F 3/0608

FOREIGN PATENT DOCUMENTS

JP 2022-057227 A 4/2022

* cited by examiner

*Primary Examiner* — Scott A Browne
*Assistant Examiner* — Izcalli Rios-Aguirre
(74) *Attorney, Agent, or Firm* — Oblon, McClelland, Maier & Neustadt, L.L.P.

(57) ABSTRACT

An information processing device is configured to control writing of data to a storage mounted on a vehicle by multiple. The information processing device includes an execution device. A storage area of the storage includes a shared area shared by multiple applications. A priority for allowing writing of data to the shared area is set for each of the applications. Data of each of the applications includes transfer data to be transmitted to a data center and normal data different from the transfer data. The execution device is configured to set the priority of writing of the transfer data when the transfer data is written to the shared area to be higher than the priority of writing of the normal data.

6 Claims, 3 Drawing Sheets

INFORMATION PROCESSING DEVICE, INFORMATION PROCESSING METHOD, AND STORAGE MEDIUM STORING INFORMATION PROCESSING PROGRAM

BACKGROUND

1. Field

The present disclosure relates to an information processing device, an information processing method, and a storage medium storing an information processing program.

2. Description of Related Art

For example, Japanese Laid-Open Patent Publication No. 2022-57227 describes an apparatus that includes a shared storage used by multiple applications to write and read data.

In order to efficiently use the storage capacity of the storage, it is conceivable to use a part of the storage area as a shared area, to which various applications can write data. However, when the data storage amount of each application increases and the free space of the shared area becomes insufficient, data cannot be written to the shared area any more. Therefore, it is necessary to delete data of an application having a low priority from the shared area in accordance with a priority of data writing preset for each application. When the priorities of data writing are set in this manner, there is a possibility that applications with lower priorities may not be able to write their data to the shared area. Furthermore, even in a case in which the shared area is entirely occupied by data of applications with lower priorities, if a data write request is made by an application with a higher priority, the data of the lower-priority applications may be deleted from the shared area. In this manner, when the shared area is full of data so that the free space is insufficient, there is a possibility that data of applications with lower priorities may fail to be written to the shared area.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an information processing device is configured to control writing of data to a storage mounted on a vehicle by multiple applications. The device includes processing circuitry. A storage area of the storage includes a shared area shared by multiple applications. A priority for allowing writing of data to the shared area is set for each of the applications. Data of each of the applications includes transfer data to be transmitted to a data center and normal data different from the transfer data. The processing circuitry is configured to set a priority of writing of the transfer data, when the transfer data is written to the shared area, to be higher than a priority of writing of the normal data.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an information processing device, an information processing method, and an information processing program according to one embodiment will be described with reference to the drawings.

Configuration of Information Processing Device

Figure 1:
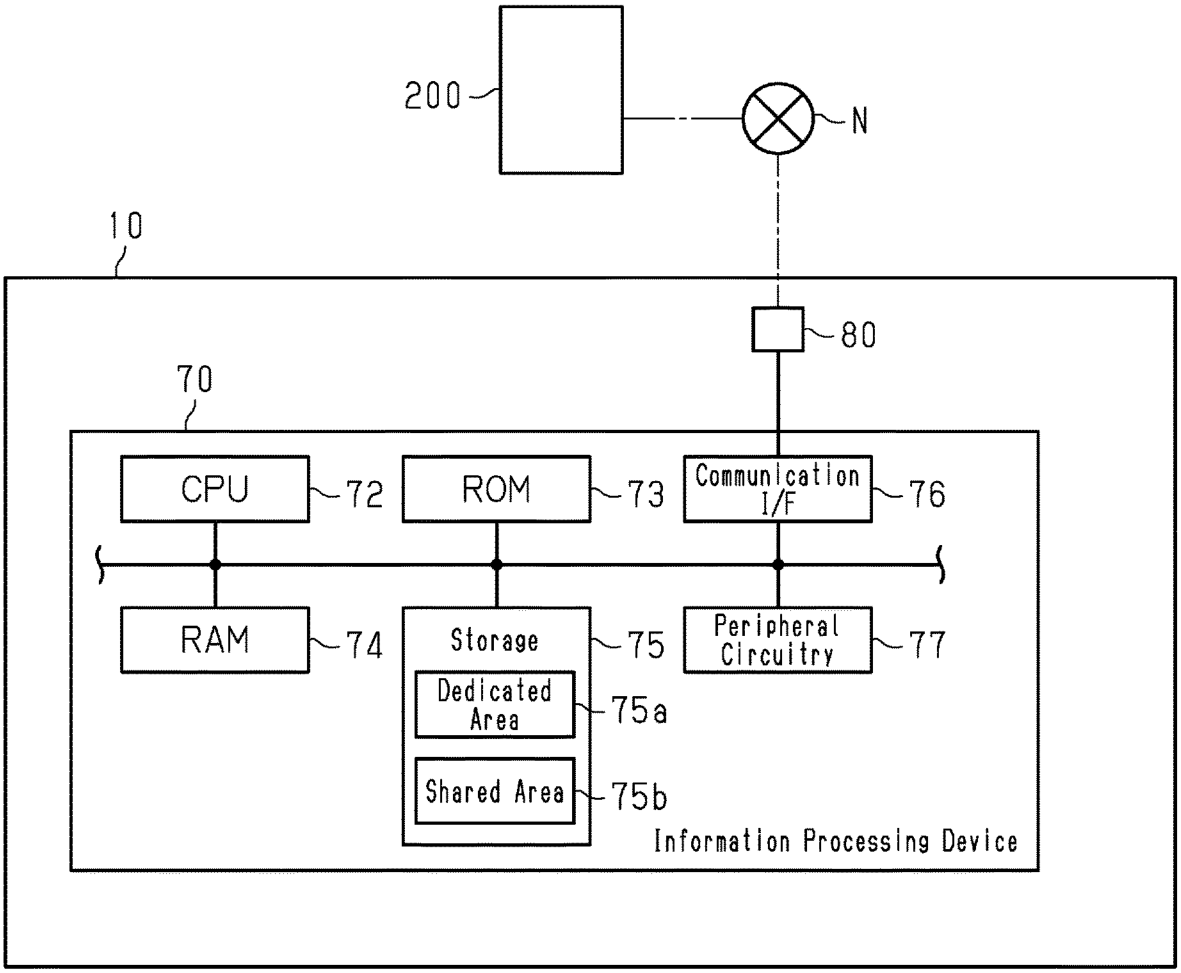
FIG. 1 is a schematic diagram showing the configuration of an information processing device according to one embodiment.

As shown in FIG. 1, the vehicle 10 includes an information processing device 70.

The information processing device 70 includes a central processing unit CPU 72, a ROM 73, a RAM 74, a storage 75, a communication interface 76, and peripheral circuitry 77, which can communicate with each other via an internal bus.

The storage 75 includes, for example, a NAND memory or the like, and allows for writing, reading, and deletion of data by multiple applications. The storage area of the storage 75 is logically divided into multiple areas. For example, the storage area of the storage 75 is divided into a dedicated area *75a* and a shared area *75b*.

The dedicated area *75a* is a storage area exclusively used by a specific application among multiple applications.

The shared area *75b* is a storage area shared by multiple applications. The capacity of the storage area used by each application is dynamically changed.

The communication interface 76 is connected to an external bus. A communication device 80 is connected to the external bus. The communication device 80 is connected to a network N by wireless communication. A data center 200 including a server and the like is connected to the network N.

The peripheral circuitry 77 includes a circuit that generates a clock signal regulating operations of the information processing device 70, a power supply circuit, and a reset circuit.

By causing the CPU 72 to execute programs stored in the ROM 73, the information processing device 70 controls writing, reading, deletion, and the like of data in the storage

75 by multiple applications. In the present embodiment, the CPU 72 performing such controls is an execution device.

The information processing device 70 executes a transmission process of transmitting data of applications written in the shared area 75*b* to the data center 200. When executing the transmission process, the CPU 72 writes, as transfer data, data to be transmitted to the data center 200 to the shared area 75*b*. Then, the CPU 72 transmits the written transfer data to the data center 200. Such writing of transfer data to the shared area 75*b* is executed at specified intervals during operation of the CPU 72.

Priority of Writing of Data

In the present embodiment, the CPU 72 allows data from multiple applications to be written to the shared area 75*b*. Additionally, the priority with which the CPU 72 allows for the data writing is set for each of the multiple applications.

Specifically, priorities are pre-assigned to each application as numbers, and the smaller the number, the higher the priority of data writing.

A priority A is set for a static data write request by a user. The priority A is a higher priority among the set priorities. Static data write requests by the user include actions such as writing of application data to the shared area 75*b* when the user requests the installation of a new application.

Priorities X1 to Xn, pre-assigned to each application for writing the transfer data, are all numerically greater than the priority A. Therefore, the priorities X1 to Xn are lower priorities than the priority A. The symbol n corresponds to the number of the applications. For example, when the number of applications that transmit data to the data center 200 is three, the priorities of the transfer data are priorities X1, X2, and X3, and the relationship between the numbers of the priorities is $X1<X2<X3$. Therefore, the priorities for writing transfer data are X1, X2, and X3 in descending order of priority.

The priority of writing of normal data, which is different from transfer data, to the shared area 75*b* by each application is a number obtained by adding a prescribed value B to the corresponding one of the priorities X1 to Xn. The prescribed value B is an integer greater than the values of $Xn-X1$. For example, when $Xn-X1=2$, the prescribed value B is a value greater than 2, that is, a value greater than or equal to 3. As an example, when the priority X1 is set to 51, the priority X2 is set to 52, the priority X3 is set to 53, and the prescribed value B is set to 1000, the priority of the application corresponding to the priority X1 at the time of normal writing is $X1+B=1051$. The priority of the application corresponding to the priority X2 at the time of normal writing is $X2+B=1052$. The priority of the application corresponding to the priority X3 at the time of normal writing is $X3+B=1053$. By setting the prescribed value B in this way, the priority at the time of normal writing and the priority at the time of writing transfer data do not conflict with each other.

Figure 2:
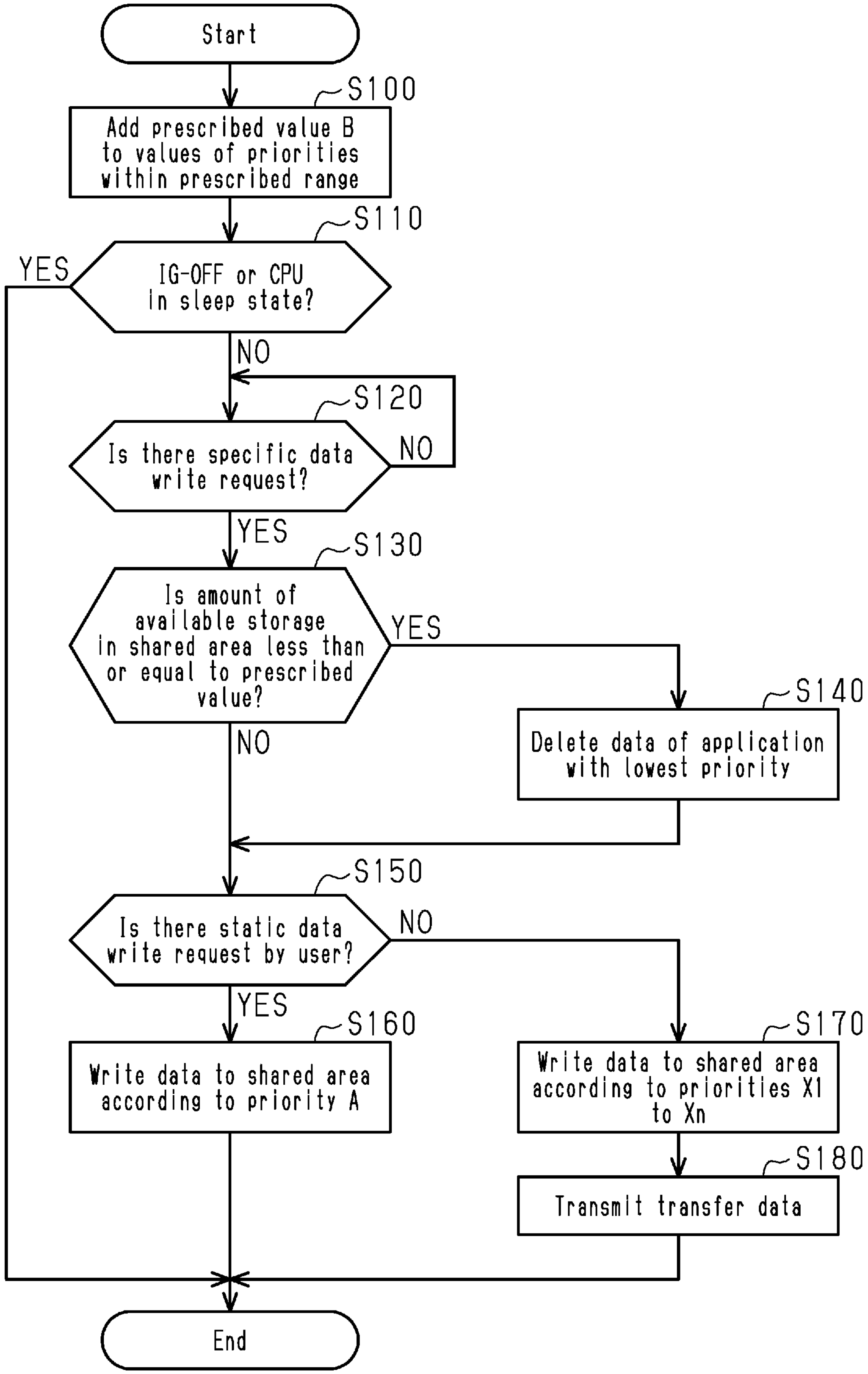
FIG. 2 is a flowchart showing a procedure of processes executed by the information processing device shown in FIG. 1.

Next, a process executed by the information processing device 70, which includes the CPU 72 as an execution device, will be described with reference to FIG. 2. The process shown in FIG. 2 is started when the ignition switch of the vehicle 10 is turned on or when the CPU 72 is activated. This process is repeatedly executed at prescribed intervals. In the following description, the number of each step is represented by the letter S followed by a numeral.

In the series of processes shown in FIG. 2, the information processing device 70 first executes a process of adding the above-described prescribed value B to values of priorities within a prescribed range (S100). The values of priorities within the prescribed range are priorities set in advance for writing of transfer data, and refer to the above-described priorities X1 to Xn.

Next, the information processing device 70 determines whether the ignition switch has been turned off or whether the CPU 72 is in a sleep state (S110).

When making a negative determination in S110, the information processing device 70 determines whether there is a specific data write request (S120). The specific data write request in S120 is a transfer data write request or a static data write request by the user.

When determining that there is no specific data write request (S120: NO), the information processing device 70 repeats the process of S120. The priority of normal data writing of each application when a negative determination is made in the process of S120 conforms to the priority calculated in the process of S100.

When determining that there is a specific data write request in the process of S120 (S120: YES), the information processing device 70 determines whether the amount of available storage in the shared area 75*b* is less than or equal to a prescribed value L (S130). The prescribed value L, which is set in advance, is the minimum free space required for writing data to the shared area 75*b*.

When determining that the amount of available storage of the shared area 75*b* is less than or equal to the prescribed value L (S130: YES), the information processing device 70 executes a process of deleting data of the application having the lowest priority from the shared area 75*b* (S140). In the process of S140, for example, the data with the highest numerical value of priority, to which the prescribed value B has been added, is deleted. The execution of the process of S140 secures a data writing area in the shared area 75*b*.

When determining in the process of S130 that the amount of available storage of the shared area 75*b* exceeds the prescribed value L (S130: NO) or after executing the process of S140, the information processing device 70 executes the process of S150. In the process of S150, the information processing device 70 executes a process of determining whether there is a static data write request by the user.

When determining that there is a static data write request by the user (S150: YES), the information processing device 70 writes static data requested by the user to the shared area 75*b* in accordance with the priority A (S160).

When the information processing device 70 determines in the process of S150 that there is no static data write request by the user (S150: NO), the current specific data write request is a write request for transfer data. Consequently, the information processing device 70 writes the transfer data to the shared area 75*b* according to the priorities X1 to Xn corresponding to the application related to the transfer data (S170). When writing of the transfer data to the shared area 75*b* is completed, the information processing device 70 executes a process of transmitting the written transfer data to the data center 200 (S180).

When making an affirmative determination in the process of S110 or after executing the process of S160 or the process of S180, the information processing device 70 terminates the present process in the current execution cycle.

Operation and Advantages

Operation and advantages of the present embodiment will now be described.

(1) In the process of S100 shown in FIG. 2, the process of adding the prescribed value B to each value of the priorities X1 to Xn is executed. As a result, when transfer data to be sent to the data center 200 is written to the shared area 75*b*, the priority X1 to Xn of the writing of the transfer data of each application is higher than the priorities (X1+B) to (Xn+B) of writing normal data of the respective applications.

In this manner, when writing transfer data to be sent to the data center 200 to the shared area 75*b*, the priority of the transfer data writing of each application is set to be higher than the normal data writing priority of each of the multiple applications. This allows data of a low priority application included in transfer data to be written to the shared area 75*b* of the storage 75.

(2) Since the series of processes shown in FIG. 2 is executed at specified intervals during the operation of the information processing device 70, writing of transfer data to the shared area 75*b* is executed at specified intervals during the operation of the information processing device 70. Therefore, when transmitting data of each application to the data center 200, the latest data is transmitted whenever possible.

The above-described embodiment may be modified as follows. The above-described embodiment and the following modifications can be combined as long as the combined modifications remain technically consistent with each other.

In the above-described embodiment, writing of transfer data to the shared area 75*b* is executed at specified intervals during operation of the information processing device 70. However, the transfer data can also be written at other times.

Figure 3:
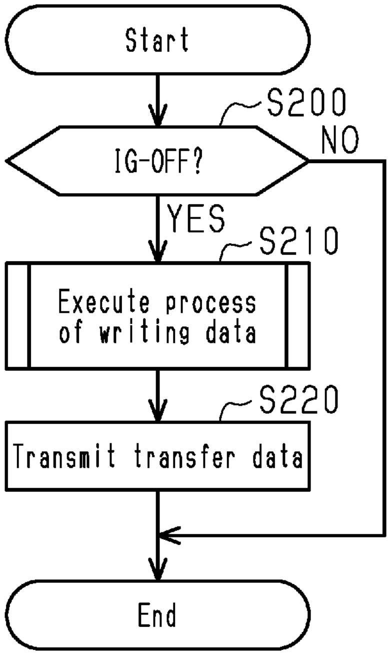
FIG. 3 is a flowchart showing a procedure of processes executed by the information processing device shown in FIG. 1.

FIG. 3 shows such a modification. As shown in FIG. 3, the information processing device 70 determines whether the ignition switch has been turned off (S200). If it is determined that the ignition switch has been turned off (S200: YES), the information processing device 70 executes a process of writing data (S210). The writing process in S210 is the same as the processes from S120 to S170 shown in FIG. 2. Then, when writing of the data to the shared area 75*b* is completed, the information processing device 70 executes a process of transmitting the written transfer data to the data center 200 (S220).

When making an affirmative determination in the process of S200 or after executing the process of S220, the information processing device 70 terminates the present process in the current execution cycle.

In this modification, writing of transfer data to the shared area 75*b* is executed when the ignition switch of the vehicle 10 is turned off. Therefore, the number of times of execution of the transfer data writing process is reduced as compared with the case in which transfer data writing to the shared area 75*b* is executed at specified intervals during the operation of the information processing device 70. This reduces the computational load required for writing transfer data. Writing of transfer data to the shared area 75*b* may be executed immediately before the information processing device 70 enters a sleep state.

The information processing device 70, which is configured as a computer, is not limited to the one that includes the CPU 72 and the ROM 73 and executes software processing. For example, the information processing device 70 may include a dedicated hardware circuit (e.g. an application specific integrated circuit: ASIC) that executes at least part of the processes executed in the above-described embodiment in hardware. That is, the information processing device may be processing circuitry that includes any one of the following configurations (a) to (c).

(a) Processing circuitry including at least one processor that executes all of the above-described processes according to programs and at least one program storage device such as a ROM that stores the programs.

(b) Processing circuitry including at least one processor and at least one program storage device that execute part of the above-described processes according to the programs and at least one dedicated hardware circuit that executes the remaining processes.

(c) Processing circuitry including at least dedicated hardware circuit that executes all of the above-described processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An information processing device configured to control writing of data to a storage mounted on a vehicle by multiple applications, the information processing device comprising:

processing circuitry, wherein a storage area of the storage includes a shared area shared by multiple applications, a priority for allowing writing of data to the shared area is set for each of the applications, data of each of the applications includes transfer data to be transmitted to a data center and normal data different from the transfer data, and the processing circuitry is configured to:

set a priority of writing of the transfer data to the shared area to be higher than a priority of writing of the normal data to the shared area so that the transfer data is stored in the shared area in preference to the normal data;

assign priorities for writing the normal data by adding a first prescribed value to priorities assigned for writing the transfer data, the first prescribed value being greater than a difference between a highest value and a lowest value of the priorities for writing the transfer data, so that the priorities for writing the normal data are outside a range from the highest value to the lowest value of the priorities for writing the transfer data;

determine, in response to receiving a transfer data write request, whether an amount of available storage in the shared area is less than or equal to a second prescribed value;

delete data of the application having a lowest priority from the shared area in response to determining that the amount of available storage of the shared area is less than or equal to the second prescribed value;

write the transfer data to the shared area; and transmit the written transfer data to the data center.

2. The information processing device according to claim 1, wherein the processing circuitry is configured to execute writing of the transfer data to the shared area at specified intervals during operation of the processing circuitry.

3. The information processing device according to claim 1, wherein the processing circuitry is configured to execute writing of the transfer data to the shared area when an ignition switch of the vehicle is turned off.

4. An information processing method for controlling writing of data to a storage mounted on a vehicle by multiple applications, wherein a storage area of the storage includes a shared area shared by multiple applications, a priority for allowing writing of data to the shared area is set for each of the applications, data of each of the applications includes transfer data to be transmitted to a data center and normal data different from the transfer data, and the information processing method comprises:

setting a priority of writing of the transfer data to the shared area to be higher than a priority of writing of the normal data to the shared area so that the transfer data is stored in the shared area in preference to the normal data;

assigning priorities for writing the normal data by adding a first prescribed value to priorities assigned for writing the transfer data, the first prescribed value being greater than a difference between a highest value and a lowest value of the priorities for writing the transfer data, so that the priorities for writing the normal data are outside a range from the highest value to the lowest value of the priorities for writing the transfer data;

determining, in response to receiving a transfer data write request, whether an amount of available storage in the shared area is less than or equal to a second prescribed value;

deleting data of the application having a lowest priority from the shared area in response to determining that the amount of available storage of the shared area is less than or equal to the second prescribed value;

writing the transfer data to the shared area; and transmitting the written transfer data to the data center.

5. A non-transitory storage medium storing an information processing program, the program being configured to cause a computer to execute a process of controlling writing of data to a storage mounted on a vehicle by multiple applications, wherein a storage area of the storage includes a shared area shared by multiple applications, a priority for allowing writing of data to the shared area is set for each of the applications, data of each of the applications includes transfer data to be transmitted to a data center and normal data different from the transfer data, and the information processing program is configured to cause the computer to:

set a priority of writing of the transfer data to the shared area to be higher than a priority of writing of the normal data to the shared area so that the transfer data is stored in the shared area in preference to the normal data;

assign priorities for writing the normal data by adding a first prescribed value to priorities assigned for writing the transfer data, the first prescribed value being greater than a difference between a highest value and a lowest value of the priorities for writing the transfer data, so that the priorities for writing the normal data are outside a range from the highest value to the lowest value of the priorities for writing the transfer data;

determine, in response to receiving a transfer data write request, whether an amount of available storage in the shared area is less than or equal to a second prescribed value;

delete data of the application having a lowest priority from the shared area in response to determining that the amount of available storage of the shared area is less than or equal to the second prescribed value;

write the transfer data to the shared area; and transmit the written transfer data to the data center.

6. The information processing device according to claim 1, wherein the priorities for writing the normal data do not overlap with the range of the priorities for writing the transfer data.

* * * * *